US012614342B2

(12) United States Patent
Iwamoto

(10) Patent No.: US 12,614,342 B2
(45) Date of Patent: Apr. 28, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shohei Iwamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/618,819

(22) Filed: Mar. 27, 2024

(65) Prior Publication Data

US 2024/0331272 A1 Oct. 3, 2024

(30) Foreign Application Priority Data

Mar. 31, 2023 (JP) ................................. 2023-056850

(51) Int. Cl.
| | |
|---|---|
| *G06T 15/20* | (2011.01) |
| *G06F 3/033* | (2013.01) |
| *G06F 3/0338* | (2013.01) |
| *G06F 3/0362* | (2013.01) |

(52) U.S. Cl.
CPC ............ *G06T 15/20* (2013.01); *G06F 3/0334* (2013.01); *G06F 3/0338* (2013.01); *G06F 3/0362* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2020/0029065 A1* | 1/2020 | Aizawa ................. | G06F 3/0205 |
| 2020/0073541 A1 | 3/2020 | Matsubayashi | |
| 2020/0276933 A1* | 9/2020 | Chen ......................... | B60R 1/27 |
| 2021/0014425 A1* | 1/2021 | Matsubayashi ...... | H04N 5/2224 |
| 2021/0016172 A1* | 1/2021 | Huang .................... | A63F 13/92 |

FOREIGN PATENT DOCUMENTS

| | | |
|---|---|---|
| JP | 2020014177 A | 1/2020 |
| JP | 2020036116 A | 3/2020 |
| JP | 2021015440 A | 2/2021 |
| JP | 2021190917 A | 12/2021 |

* cited by examiner

*Primary Examiner* — Gelek W Topgyal
(74) *Attorney, Agent, or Firm* — Canon U.S.A., Inc. IP Division

(57) ABSTRACT

A virtual camera control apparatus acquires input information about an input corresponding to an operation performed on a first member, the input changing virtual camera parameters including a parameter corresponding to a position of a virtual camera or a position of a point-of-gaze corresponding to the virtual camera, a parameter corresponding to an orientation of the virtual camera, and a parameter corresponding to an angle of field of the virtual camera, acquires a first adjustment parameter specified based on an operation performed on a second member, acquires a second adjustment parameter changed depending on an amount of operation of a third member, and decides on an amount of change of each of the virtual camera parameters based on the input, the first adjustment parameter, and the second adjustment parameter.

12 Claims, 11 Drawing Sheets

FIG.4

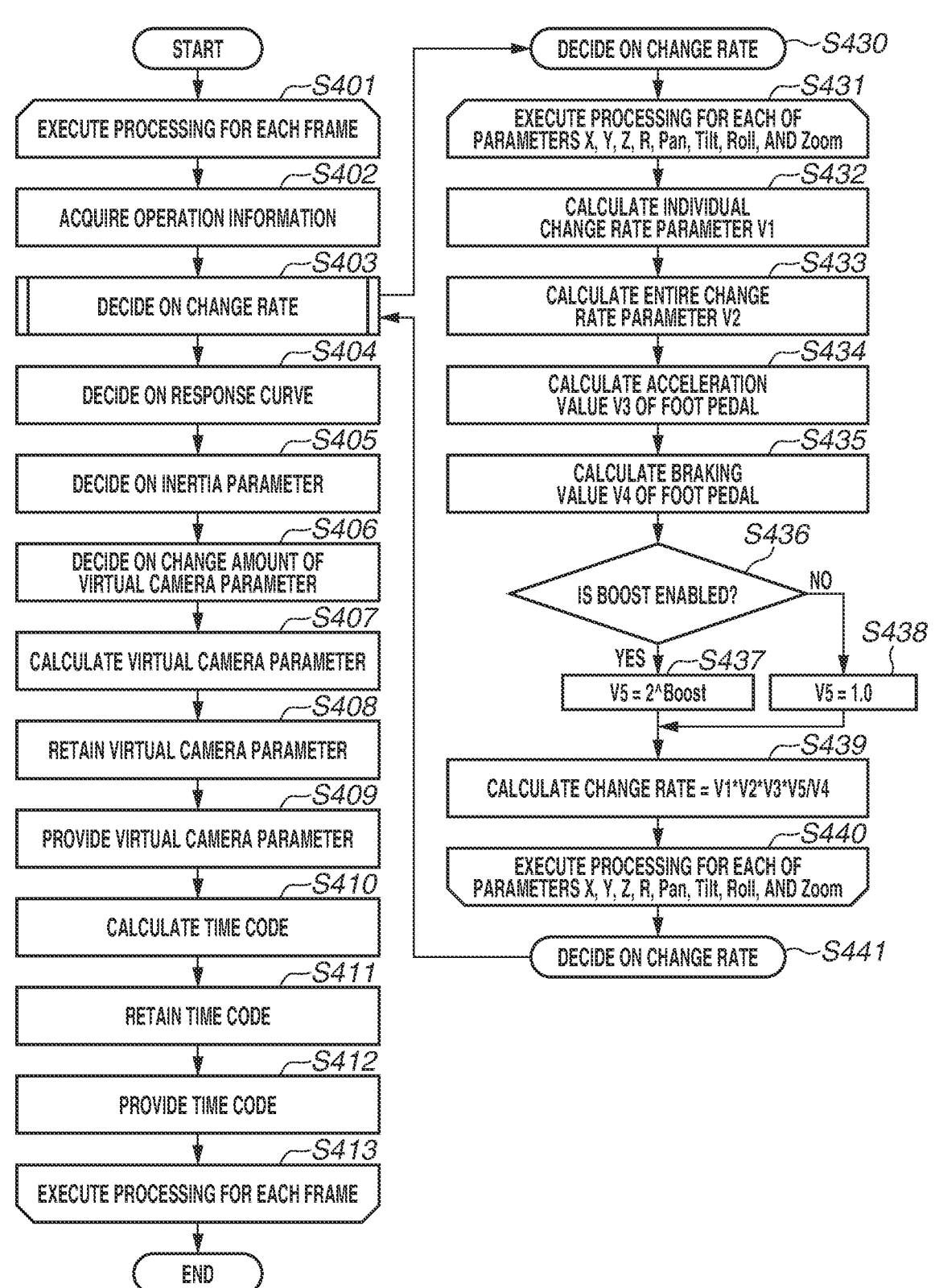

START

EXECUTE PROCESSING FOR EACH FRAME ~S401

ACQUIRE OPERATION INFORMATION ~S402

DECIDE ON CHANGE RATE ~S403

DECIDE ON RESPONSE CURVE ~S404

DECIDE ON INERTIA PARAMETER ~S405

DECIDE ON CHANGE AMOUNT OF VIRTUAL CAMERA PARAMETER ~S406

CALCULATE VIRTUAL CAMERA PARAMETER ~S407

RETAIN VIRTUAL CAMERA PARAMETER ~S408

PROVIDE VIRTUAL CAMERA PARAMETER ~S409

CALCULATE TIME CODE ~S410

RETAIN TIME CODE ~S411

PROVIDE TIME CODE ~S412

EXECUTE PROCESSING FOR EACH FRAME ~S413

END

DECIDE ON CHANGE RATE ~S430

EXECUTE PROCESSING FOR EACH OF PARAMETERS X, Y, Z, R, Pan, Tilt, Roll, AND Zoom ~S431

CALCULATE INDIVIDUAL CHANGE RATE PARAMETER V1 ~S432

CALCULATE ENTIRE CHANGE RATE PARAMETER V2 ~S433

CALCULATE ACCELERATION VALUE V3 OF FOOT PEDAL ~S434

CALCULATE BRAKING VALUE V4 OF FOOT PEDAL ~S435

IS BOOST ENABLED? ~S436

NO

YES $V5 = 2^{\wedge}Boost$ ~S437

$V5 = 1.0$ ~S438

CALCULATE CHANGE RATE = V1*V2*V3*V5/V4 ~S439

EXECUTE PROCESSING FOR EACH OF PARAMETERS X, Y, Z, R, Pan, Tilt, Roll, AND Zoom ~S440

DECIDE ON CHANGE RATE ~S441

Figure 11:
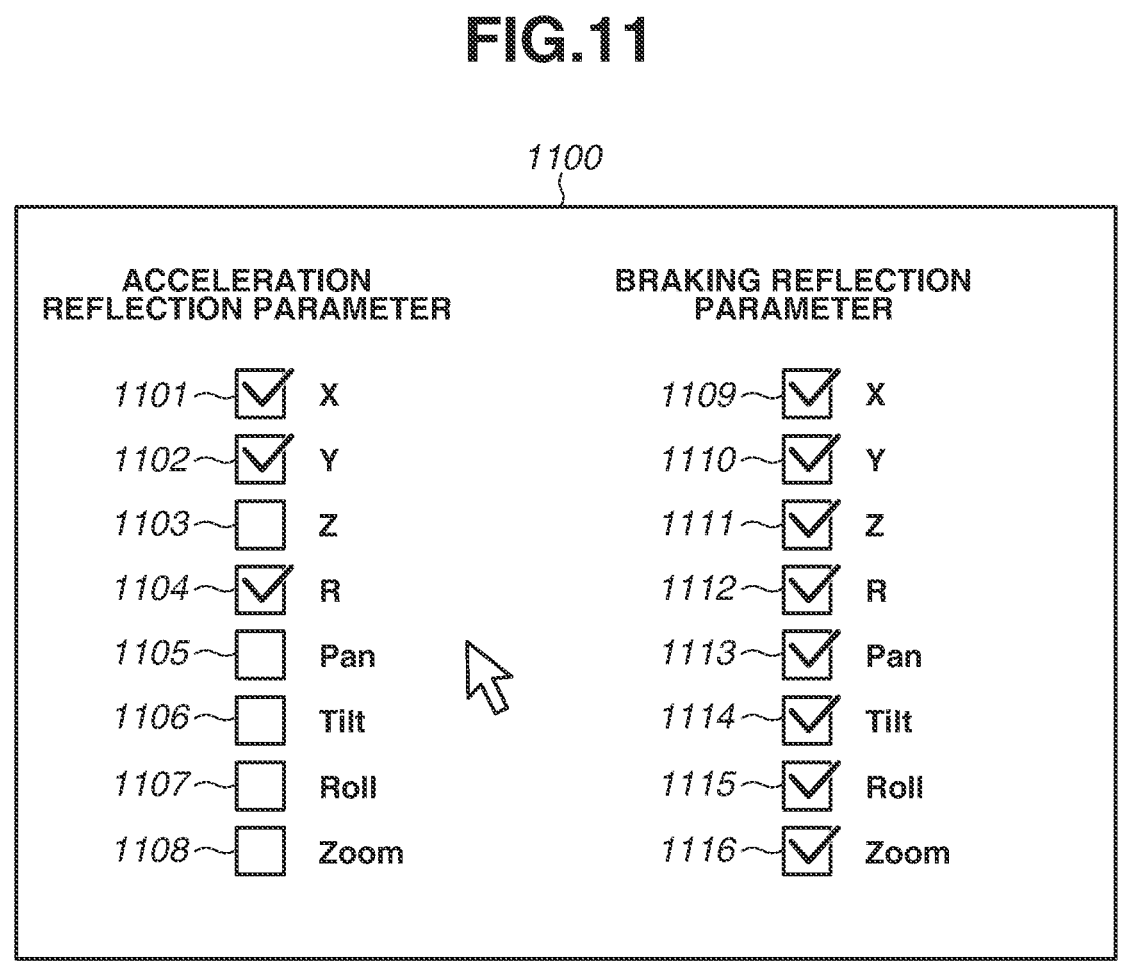

ACCELERATION REFLECTION PARAMETER

1101 — ☑ X
1102 — ☑ Y
1103 — ☐ Z
1104 — ☑ R
1105 — ☐ Pan
1106 — ☐ Tilt
1107 — ☐ Roll
1108 — ☐ Zoom

BRAKING REFLECTION PARAMETER

1109 — ☑ X
1110 — ☑ Y
1111 — ☑ Z
1112 — ☑ R
1113 — ☑ Pan
1114 — ☑ Tilt
1115 — ☑ Roll
1116 — ☑ Zoom

INFORMATION PROCESSING APPARATUS, INFORMATION PROCESSING METHOD, AND STORAGE MEDIUM

FIELD

The present disclosure relates to an apparatus, a method, and a storage medium storing a program for generating virtual viewpoint images.

BACKGROUND

Description of the Related Art

It is known to provide high-profile techniques for generating virtual viewpoint images which express a view from a desired viewpoint (e.g., a virtual camera) in a virtual space. Such techniques use a plurality of images captured in a multi-viewpoint synchronous manner by a plurality of image capturing apparatuses installed at different positions. A user who operates a virtual camera operates the virtual camera with reference to a generated virtual viewpoint image. Thus, to generate a virtual viewpoint image used for live-streaming, the user considers the composition of the virtual viewpoint image based on how the user wishes to capture a subject. The user also considers a previously estimated movement of the subject, and then controls the position, the orientation, and the angle of field of the virtual camera, accordingly. At this time, to facilitate the operation of the virtual camera, it is known to provide a technique which allows a user to adjust a change rate per frame when operating the position and direction of the virtual camera in accordance with the preference of the user. Further, Japanese Patent Application Laid-Open No. 2021-190917 discusses a technique which allows a user to previously make settings to adjust the change rate depending on whether a virtual viewpoint image generated is on air.

SUMMARY

According to an aspect of the present disclosure, an information processing apparatus includes a first acquisition unit configured to acquire input information about an input corresponding to an operation performed on a first member, the input changing virtual camera parameters including a parameter corresponding to a position of a virtual camera corresponding to a virtual view point image generated based on a plurality of captured images acquired by image-capturing a subject by a plurality of image capturing apparatuses or a position of a point-of-gaze corresponding to the virtual camera, a parameter corresponding to an orientation of the virtual camera, and a parameter corresponding to an angle of field of the virtual camera, a second acquisition unit configured to acquire a first adjustment parameter for adjusting an amount of change of each of the virtual camera parameters with respect to an amount of operation of the operation, the first adjustment parameter being specified based on an operation performed on a second member, the second acquisition unit retaining the first adjustment parameter acquired through an input performed last time in a case where the second member is not operated, a third acquisition unit configured to acquire a second adjustment parameter for adjusting the amount of change of each of the virtual camera parameters with respect to the amount of operation of the operation, the second adjustment parameter being specified based on an operation performed on a third member and changed to an initial value in a case where the third member is not operated, and a decision unit configured to decide on the amount of change of each of the virtual camera parameters based on the input information, the first adjustment parameter, and the second adjustment parameter.

Further features of the present disclosure will become apparent from the following description of embodiments with reference to the attached drawings.

BRIEF DESCRIPTION OF THE DRAWINGS

FIG. 4 is a flowchart illustrating processing for calculating virtual camera parameters of the virtual camera control apparatus according to the first embodiment.

FIG. 11 is a diagram illustrating an example of a GUI for specifying virtual camera parameters in which acceleration and braking values are reflected, according to the second embodiment.

DESCRIPTION OF THE EMBODIMENTS

Hereinafter, embodiments of the present disclosure will be described with reference to the appended drawings. The embodiments described hereinafter are not intended to limit the scope of the present disclosure, and not all of the combinations of features described in the present embodiments are used as the solutions of the present disclosure.

A first embodiment will be described with respect to parameters for adjusting the change rate of a camera parameter of a virtual camera corresponding to a virtual viewpoint image generated based on a plurality of images captured by a plurality of image capturing apparatuses. A first adjustment parameter previously set and a second adjustment parameter changed by a user as appropriate while the user is operating the virtual camera are provided as the parameters for adjusting a change rate.

A combination of the above-described two adjustment parameters facilitates the operation of the virtual camera according to the movement of the subject.

Figure 1:
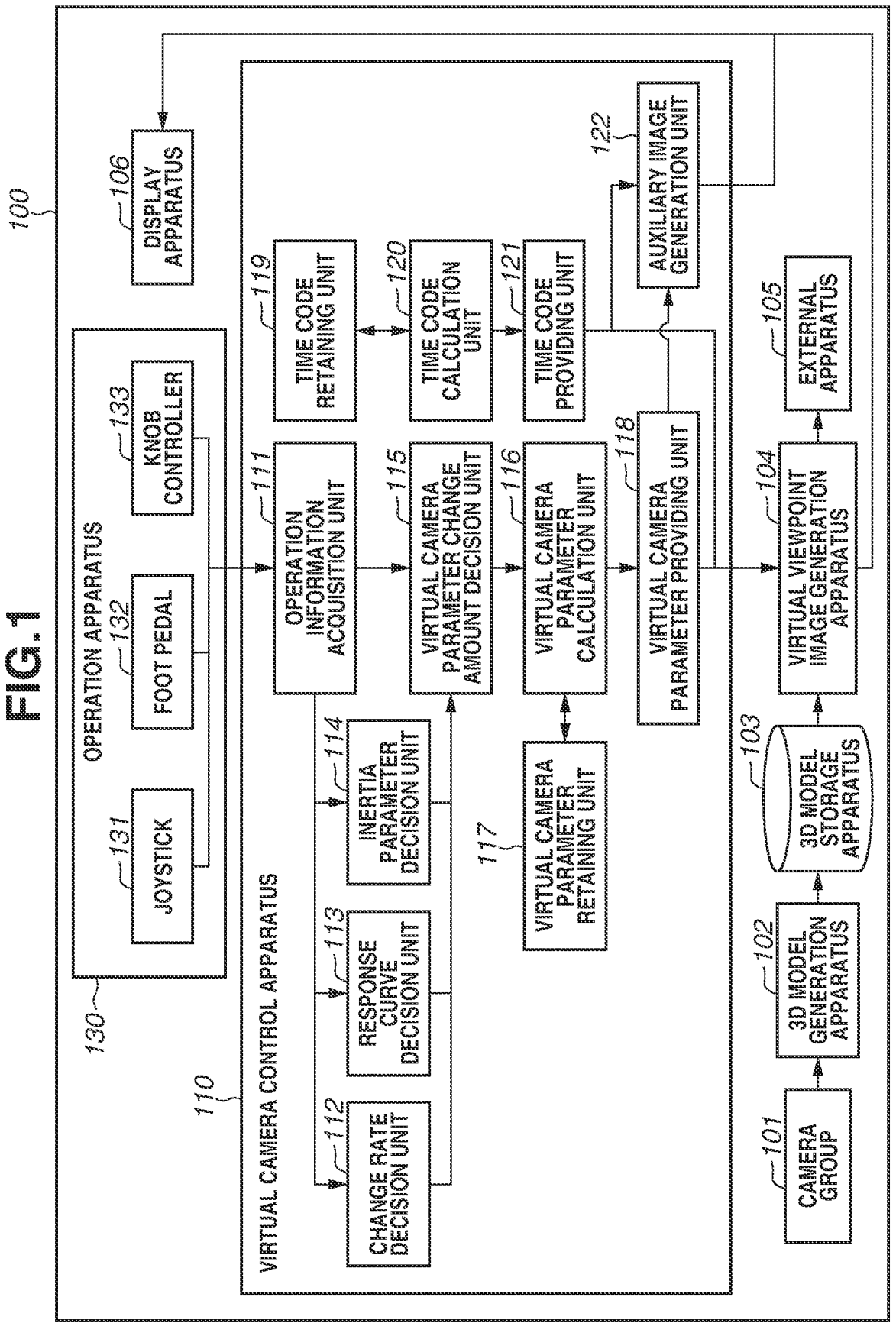
FIG. 1 is a block diagram illustrating a system configuration of an image processing system according to a first embodiment.

FIG. 1 is a block diagram illustrating a system configuration of an image processing system 100 according to the present embodiment of the present disclosure.

The image processing system 100 includes a camera group 101, a three-dimensional (3D) model generation apparatus 102, a 3D model storage apparatus 103, a virtual viewpoint image generation apparatus 104, an external apparatus 105, a virtual camera control apparatus 110, an operation apparatus 130, and a display apparatus 106.

The image processing system 100 is a system which generates a virtual viewpoint image expressing a view from a specified virtual viewpoint based on a plurality of images captured by a plurality of image capturing apparatuses and a specified virtual viewpoint. A virtual viewpoint image according to the present embodiment is so-called "free viewpoint image". However, the present embodiment is not limited to images corresponding to a viewpoint freely (optionally) specified by a user. For example, images corresponding to a viewpoint selected by a user from among a plurality of candidates are also included as the virtual viewpoint image. Further, while the present embodiment is mainly described with respect to a case where a virtual viewpoint is specified (e.g., determined or defined) through a user operation, a virtual viewpoint may automatically be specified based on a result acquired through image analysis. Furthermore, while the present embodiment is mainly described with respect to a case where a virtual viewpoint image is a moving image, a virtual viewpoint image can be a still image.

Viewpoint information used in generation of a virtual viewpoint image is information indicating the position and the orientation (e.g., line-of-sight direction) of a virtual viewpoint. Specifically, viewpoint information is a set of parameters which includes parameters indicating a three-dimensional position of a virtual viewpoint (e.g., an X, Y, Z parameter) and parameters indicating the orientation of the virtual viewpoint in the Pan, Tilt, and Roll directions (e.g., a Pan, Tilt, and Roll parameter). In addition, the contents of the viewpoint information are not limited to the above. For example, a set of parameters as viewpoint information may include a parameter indicating the size of the field of view (i.e., the angle of field) of a virtual viewpoint (e.g., an angle of field parameter). Furthermore, viewpoint information may include a plurality of sets of parameters. For example, viewpoint information may include a plurality of sets of parameters each of which corresponds to each of frames constituting a virtual viewpoint moving image, and may indicate the position and the orientation of a virtual viewpoint at each of consecutive time points.

A virtual camera is an imaginary camera different from a plurality of image capturing apparatuses actually installed in the periphery of an image capturing area. A virtual camera is a concept, as a matter of convenience, used for describing a virtual viewpoint relating to generation of a virtual viewpoint image. In other words, a virtual viewpoint image can be regarded as an image captured at a virtual viewpoint set in a virtual space associated with an image capturing area. The position and the orientation of the virtual viewpoint of this image capture can be represented as the position and the orientation of the virtual camera. In other words, on the assumption that a camera is located at the position of a virtual viewpoint set in a space, a virtual viewpoint image is an image which simulates a captured image acquired by that camera. Further, in the present embodiment, the content of temporal change in a virtual viewpoint is described as a virtual camera path. However, the concept of a virtual camera is not essentially used for realizing the configurations according to the present embodiment. In other words, it is sufficient that with information indicating a specific position and information indicating an orientation in a space set at least, a virtual viewpoint image is generated based on the set information.

In order to generate a 3D model for the subject, the camera group 101 executes complete-synchronous image capturing. In the present embodiment, the camera group 101 consists of a plurality of image capturing apparatuses which capture an image capturing area in a plurality of directions. Examples of an image capturing area include an athletic field where sporting events, such as soccer and karate, are held, and a stage where a concert and a theatrical play are performed. The plurality of image capturing apparatuses is installed at different positions to surround the above-described image capturing area, and executes image capturing in synchronization with each other. In addition, the plurality of image capturing apparatuses does not always have to be installed in the entire circumference of the image capturing area, and can be installed in only a part of the circumference thereof depending on conditions, such as limitation in the installation site. Further, the number of image capturing apparatuses is not limited to the example illustrated in the drawings. Thus, on a soccer stadium as an image capturing area, for example, approximately thirty image capturing apparatuses may be installed in the periphery of the stadium. Furthermore, image capturing apparatuses having different functions, such as telephotographic cameras and wide-angle cameras, may be installed.

Further, it is assumed that each of the image capturing apparatuses according to the present embodiment is a camera having an independent body, capable of capturing images at an individual viewpoint. However, the present embodiment is not limited thereto, and two or more image capturing apparatuses may be included in one body. For example, a single camera having a plurality of lens groups and sensors, capable of capturing images at a plurality of viewpoints, may be installed as the plurality of image capturing apparatuses.

The 3D model generation apparatus 102 acquires images captured by the camera group 101 and generates a 3D model. The 3D model is generated through a technique, such as the Shape from Silhouette method using information about a silhouette of a foreground object or the Multi-View Stereo method using triangulation. Because the Shape from Silhouette method and the Multi-View Stereo method are known methods of generating 3D models, the descriptions thereof are omitted.

The 3D model storage apparatus 103 stores 3D models generated by the 3D model generation apparatus 102. In the present embodiment, a server as a dedicated personal computer (PC) serves as the 3D model storage apparatus 103. However, the 3D model storage apparatus 103 is not limited thereto, and can be a virtual server configured on a cloud.

Based on time codes acquired from the time code providing unit 121, the virtual viewpoint image generation apparatus 104 acquires 3D models from the 3D model storage apparatus 103. Further, the virtual viewpoint image generation apparatus 104 generates a virtual viewpoint image based on virtual camera parameters acquired from the virtual camera parameter providing unit 118, so that the virtual viewpoint image expresses an acquired 3D model captured by a virtual camera. Furthermore, the virtual viewpoint image generation apparatus 104 outputs the generated virtual viewpoint image to the external apparatus 105 and the display apparatus 106.

For example, virtual viewpoint images are generated through the following method. First, a plurality of images (multi-viewpoint images) is acquired by capturing images in different directions through a plurality of image capturing apparatuses. Next, a foreground area corresponding to a predetermined object, such as a person or a ball, and a background area other than the foreground area are extracted from multi-viewpoint images and acquired as the foreground image and the background image. Further, a foreground model expressing a three-dimensional shape of the predetermined object and texture data used for coloring the foreground model are generated based on the foreground images, and texture data used for coloring a background model expressing a three-dimensional shape of a background, such as an athletic field, is generated based on the background images. Then, the pieces of texture data are mapped on the foreground model and the background model, respectively, and rendering is executed thereon based on the virtual viewpoint indicated by the viewpoint information. Through the processing, a virtual viewpoint image is generated. However, a generation method for virtual viewpoint images is not limited thereto, and various methods can be employed. For example, a virtual viewpoint image generation method which uses projective transformation of captured images can be employed instead of employing a method using a three-dimensional model.

A foreground image is an image acquired by extracting an object area (foreground area) from a captured image captured and acquired by an image capturing apparatus. An object extracted as a foreground area is a dynamic object (moving object) that has motion, whose absolute position or shape is variable in chronological image capturing in a direction. For example, an object is a person, such as a player or a referee existing in an athletic field where a sporting event is held, a ball used for a ball game, or a singer, a player of a musical instrument, a performer, or an emcee on a concert or an entertainment show.

A background image is an image of an area (background area) at least different from the area of an object regarded as the foreground. Specifically, a background image is an image acquired by removing an object (i.e., foreground) from the captured image. Further, a background refers to an image-capturing target object which continuously stays still or nearly still in chronological image capturing in a direction. For example, the image-capturing target object is a stage where a concert is performed, a stadium where a sporting event is held, a structural object, such as a goal used for a ball game, or an athletic field. However, a background is an area at least different from the area of an object corresponding to the foreground, and another object body different from an object or the background can also be regarded as an image capturing target.

The external apparatus 105 receives virtual viewpoint images generated by the virtual viewpoint image generation apparatus 104.

For example, the external apparatus 105 is a display or an external server.

Figure 5:
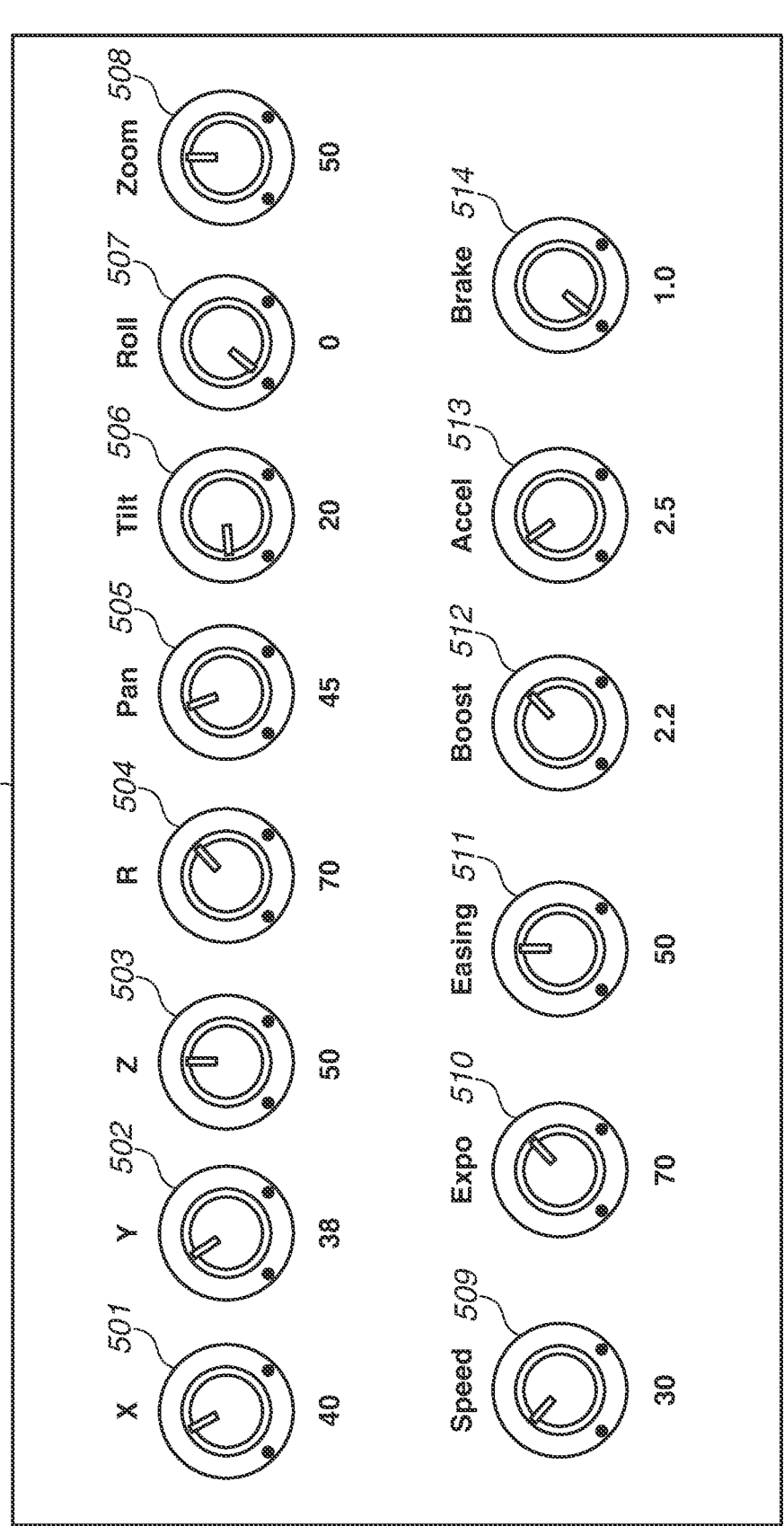
FIG. 5 is a diagram illustrating an example of a graphical user interface (GUI) which displays values set by a controller according to the first embodiment.

The display apparatus 106 displays a virtual viewpoint image generated by the virtual viewpoint image generation apparatus 104. The user who operates the virtual camera uses the virtual viewpoint image displayed on the display apparatus 106 as a reference to operate the virtual camera. The display apparatus 106 further displays an auxiliary image generated by the auxiliary image generation unit 122, the auxiliary image of which indicates camera parameters of the virtual camera. While it is assumed that a virtual viewpoint image and an auxiliary image are displayed in juxtaposition, the present embodiment is not limited thereto. For example, an icon which indicates the orientation of a virtual camera in a virtual space may be superimposed and displayed on a virtual viewpoint image. In the present embodiment, the display apparatus 106 displays an auxiliary image which indicates values of camera parameters and values of acceleration and braking of the foot pedal 132 for a knob controller 133 as illustrated in FIG. 5.

The virtual camera control apparatus 110 is an information processing apparatus which includes an operation information acquisition unit 111, a change rate decision unit 112, a response curve decision unit 113, an inertia parameter decision unit 114, a virtual camera parameter change amount decision unit 115, and a virtual camera parameter calculation unit 116. The virtual camera control apparatus 110 further includes a virtual camera parameter retaining unit 117, a virtual camera parameter providing unit 118, a time code retaining unit 119, a time code calculation unit 120, a time code providing unit 121, and an auxiliary image generation unit 122. Based on operation information received from the operation apparatus 130, the virtual camera control apparatus 110 controls a virtual camera and transmits virtual camera parameters to the virtual viewpoint image generation apparatus 104. Further, the virtual camera control apparatus 110 transmits an auxiliary image indicating the camera parameters of the controlled virtual camera to the display apparatus 106.

The operation information acquisition unit 111 acquires operation information from the operation apparatus 130. For example, the operation information is an inclination angle (inclination amount) of a joystick a user inputs on the operation apparatus 130. While the operation information is described with a joystick as an example, the operation information may be another input from which an amount of operation of the user operation can be acquired. For example, a push-in amount of a rocker switch may be acquired as the amount of operation.

The change rate decision unit 112 determines (e.g., calculates) change rates for the individual virtual camera parameters described below based on values acquired from the operation information acquisition unit 111. Specifically, the change rate decision unit 112 determines (e.g., decides on) change rates of eight virtual camera parameters, i.e., point-of-gaze coordinates (X, Y, Z) [m], the orientation (Pan, Tilt, Roll) [degree] of a virtual camera, a distance R [m] between a virtual camera and a point-of-gaze (e.g., a distance parameter), an angle of field a Zoom [mm] of a virtual camera. A point-of-gaze is a point in a virtual space, positioned on the optical axis of a virtual camera. Because a point-of-gaze is positioned on the optical axis of a virtual camera, a user who operates a virtual camera can easily generate a camera path of the virtual camera which maintains an attention subject at the center of a virtual viewpoint image by adjusting the position of the point-of-gaze to the position of the attention subject. In the present embodiment, point-of-gaze coordinates are treated as virtual camera parameters. However, the treatment as virtual camera parameters is not limited thereto, and coordinates (X, Y, Z) [m] of the position of a virtual camera may be treated as virtual camera parameters. Specific decision processing on the change rate of a virtual camera parameter will be described below in steps S430 to S441 in FIG. 4.

The response curve decision unit 113 determines (e.g., decides on or calculates) the relationship between the amount of inclination of the joystick 131 and the amount of change of a virtual camera parameter at the time of operation. This relationship is a sensitivity using a response curve, and the maximum amount of change of a virtual camera parameter with respect to the maximum amount of inclination of the joystick 131 is not changed even if the response curve is changed. In the present embodiment, the response curve is decided based on an Expo value indicated by the knob controller 133. When the Expo value is greater, the amount of change of the virtual camera parameter becomes greater even if the amount of inclination of the joystick 131 is small, and when the Expo value is smaller, the amount of change of the virtual camera parameter is smaller if the amount of inclination of the joystick 131 is small. In other words, a user operation is reflected in the amount of change at higher sensitivity when the Expo value is greater, and a user operation is reflected in the amount of change at lower sensitivity when the Expo value is smaller. For example, a curve acquired by a sigmoid function or a quadratic function is used as a response curve. However, the response curve is not limited thereto.

The inertia parameter decision unit 114 determines the effectiveness of inertia at the time of moving a virtual camera. In the present embodiment, an inertia parameter is decided based on an Easing value indicated by the knob controller 133. For example, inertia is not effective when the inertia parameter is 0. At that time, the virtual camera instantaneously stops moving when the operation for moving the virtual camera is ended. As the inertia parameter is increased, the virtual camera gradually stops moving when the operation for moving the virtual camera is ended. In addition, the inertia parameter may be a parameter which gives inertia not only when the virtual camera is moved but also when the angle of field is changed. Further, "inertia" according to the present embodiment refers to a sliding degree or an acceleration/deceleration degree associated with an amount of operation and elapsed time of the operation when the virtual camera is moved.

The virtual camera parameter change amount decision unit 115 determines (e.g., decides on) the amount of change of each of the virtual camera parameters based on information received from the operation information acquisition unit 111, the change rate decision unit 112, the response curve decision unit 113, and the inertia parameter decision unit 114. Specifically, the virtual camera parameter change amount decision unit 115 determines (e.g., decides on) the amount of change of each of the eight parameters, i.e., point-of-gaze coordinates (X, Y, Z) [m], orientation (Pan, Tilt, Roll) [degree] of a virtual camera, a distance R [m] between a virtual camera and a point-of-gaze, and an angle of field Zoom [mm] of a virtual camera.

The virtual camera parameter calculation unit 116 calculates the virtual camera parameters for a current frame based on information received from the virtual camera parameter change amount decision unit 115 and the virtual camera parameter retaining unit 117. The virtual camera parameter calculation unit 116 adds the amount of change determined by the virtual camera parameter change amount decision unit 115 to each of the virtual camera parameters for the previous frame retained by the virtual camera parameter retaining unit 117, and further executes conversion processing to calculate the virtual camera parameters for the current frame. Further, the virtual camera parameter calculation unit 116 transmits the calculated virtual camera parameters to the virtual camera parameter retaining unit 117 and updates the virtual camera parameters retained by the virtual camera parameter retaining unit 117. The conversion processing includes processing for calculating a virtual camera position from the point-of-gaze coordinates (X, Y, Z) [m], the orientation (Pan, Tilt, Roll) [degree] of a virtual camera, and the distance R [m] between a virtual camera and a point-of-gaze of the above-described eight virtual camera parameters. This conversion processing will be described with reference to FIG. 3.

The virtual camera parameter retaining unit 117 transmits the virtual camera parameters for the previous frame to the virtual camera parameter calculation unit 116. Thereafter, the virtual camera parameters transmitted from the virtual camera parameter calculation unit 116 are updated as the retained values.

The virtual camera parameter providing unit 118 transmits the virtual camera parameters acquired from the virtual camera parameter calculation unit 116 to the virtual viewpoint image generation apparatus 104 and the auxiliary image generation unit 122.

The time code retaining unit 119 retains a time code for the previous frame. In addition, the time code is retained in a format of "hh:mm:ss:ff".

The time code calculation unit 120 acquires the time code of the previous frame retained by the time code retaining unit 119 and calculates the time code of the current frame by adding one frame thereto. The time code calculation unit 120 transmits the calculated time code to the time code retaining unit 119 and updates the time code retained by the time code retaining unit 119. In the present embodiment, calculation is executed based on the assumption that reproduction is executed at a reproduction speed of 100%. However, the present disclosure is not limited thereto. For example, when reproduction is executed at a reproduction speed of 200%, the time code may be calculated by adding two frames to the time code retained by the time code retaining unit 119. Alternatively, the time code may be saved in association with a certain scene, and the time code may be calculated by calling the saved time code. In this case, the time code associated with that scene is calculated as the time code of the current frame. Then, the time code calculated by the time code calculation unit 120 is transmitted to the time code providing unit 121.

The time code providing unit 121 transmits the time code acquired from the time code calculation unit 120 to the virtual viewpoint image generation apparatus 104 and the auxiliary image generation unit 122. In the present disclosure, any method of transmission of the time code can be used. For example, a time code that is to be transmitted from the time code providing unit 121 may be attached to and transmitted together with the virtual camera parameters transmitted from the virtual camera parameter providing unit 118.

The operation apparatus 130 includes the joystick 131, the foot pedal 132, and the knob controller 133. In addition, the operation members are not limited to the above, and other operation members can be used.

Figure 6:
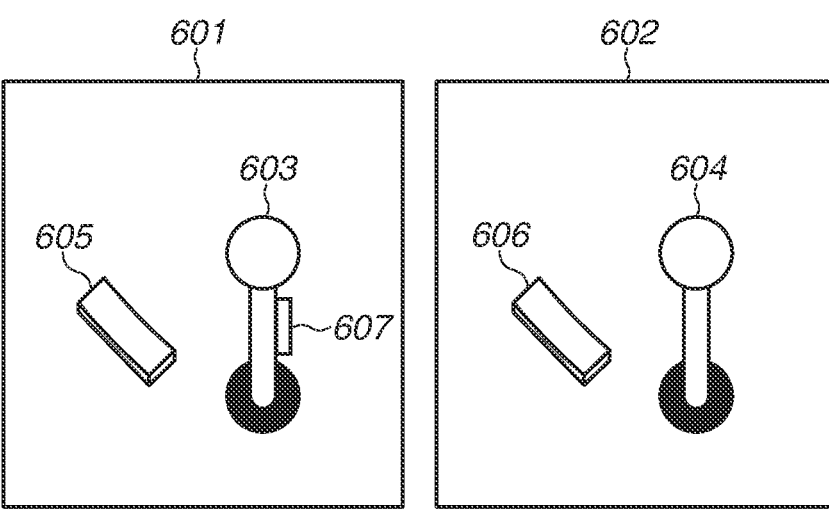
FIG. 6 is a diagram illustrating examples of joysticks according to the first embodiment.

The joystick 131 is a hardware device which allows a user to operate a virtual camera by grasping and inclining or twisting the joystick 131. FIG. 6 is a diagram illustrating examples of the joystick 131. The joystick 131 is a device like a device 601 or 602. In the present embodiment, two joysticks 603 and 604 are used. The point-of-gaze position of a virtual camera is operated by the joystick 603, and the orientation of the virtual camera is operated by the joystick 604. Further, the angle of field of the virtual camera is operated by a rocker switch 605, and a distance R between the virtual camera and the point-of-gaze is operated by a rocker switch 606. The operation apparatus 130 may also include a boost button 607 a user can push while operating the joystick 603. In the present embodiment, while the boost button 607 is being pushed, the change rate of the virtual camera parameter can be changed based on a value indicated by an icon 512 for setting a boost value described below. Further, in the present embodiment, the joystick 131 may be provided as a form of a gamepad. Generally, a gamepad includes two joysticks, so that a user operates the joysticks with the right and left thumbs respectively. Furthermore, functions corresponding to the rocker switches 605 and 606 and the boost button 607 may be allocated to buttons included in the gamepad.

Figure 7:
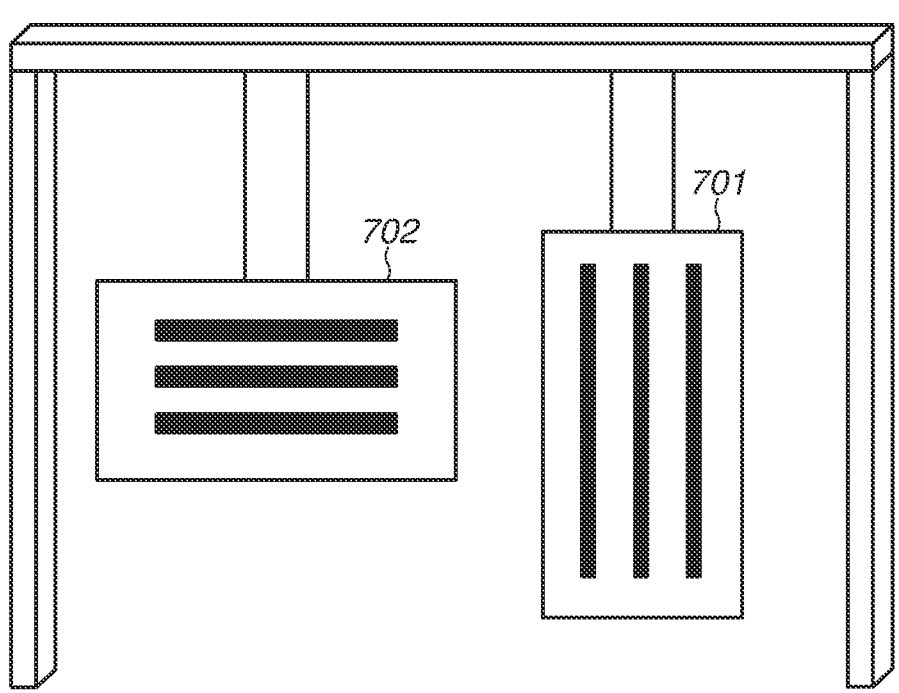
FIG. 7 is a diagram illustrating examples of foot pedals according to the first embodiment.

The foot pedal 132 is a foot-operated hardware device. FIG. 7 is a diagram illustrating examples of the foot pedal 132. The foot pedal 132 is a device like an acceleration pedal 701 and a braking pedal 702. The foot pedal 132 is a device operated with a foot, so that a user can operate the foot pedal 132 while operating the joysticks 131 with both hands. In the present embodiment, a parameter for increasing the change rate of a virtual camera is allocated to the acceleration pedal 701, and a parameter for decreasing the change rate of the virtual camera is allocated to the braking pedal 702. Further, it is assumed that the allocated parameter returns to an initial value with the foot removed from the acceleration pedal 701 and the braking pedal 702. In other words, the change rate is increased or decreased only when the foot pedal 132 is operated by a user.

Figure 8:
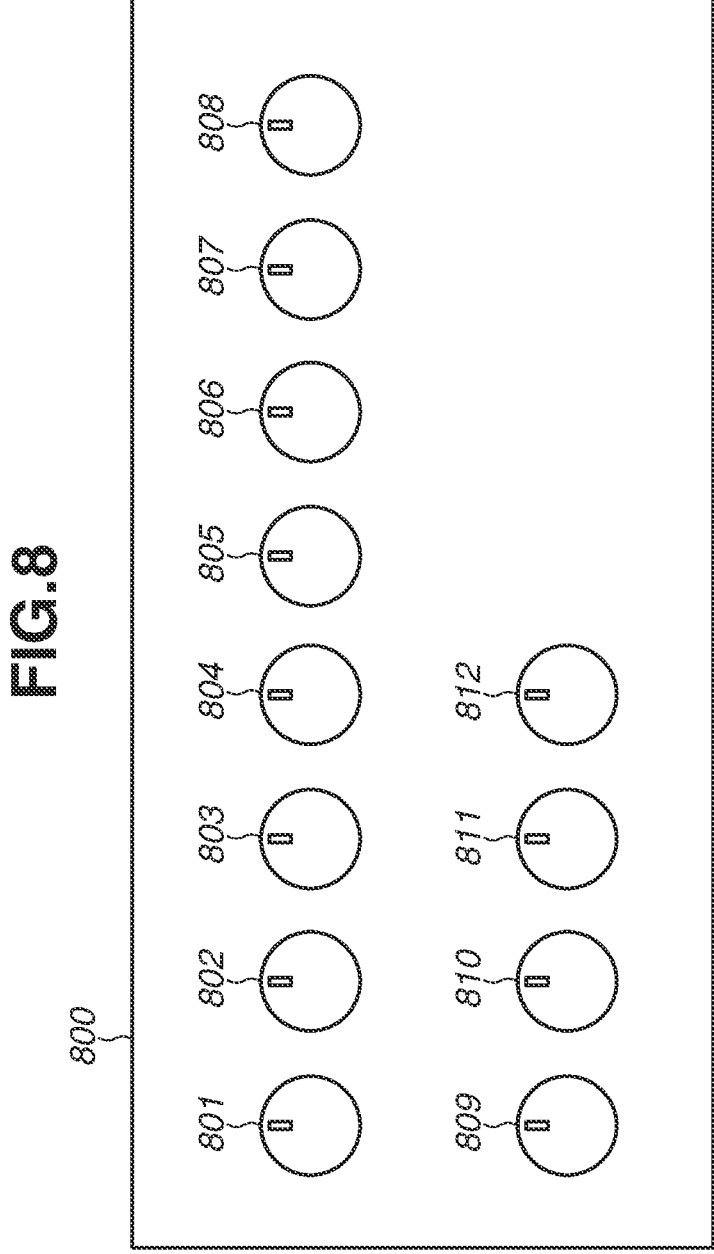
FIG. 8 is a diagram illustrating an example of a controller including knobs according to the first embodiment.

The knob controller 133 is a hardware device which includes knobs for setting change rates of various parameters relating to the operation of the virtual camera parameters. FIG. 8 is a diagram illustrating an example of the knob controller 133. The knob controller 133 is a device including a plurality of knobs. In the present embodiment, twelve knobs 801 to 812 correspond to twelve graphics of icons 501 to 512 displayed in an auxiliary image 500 in FIG. 5, respectively. For example, as the knob 801 is rotated, the graphic of the icon 501 serving as a graphical user interface (GUI) indicates the rotation similarly, and the corresponding numerical value is displayed on the lower side of the graphic of the icon 501 in FIG. 5. In the example illustrated in FIG. 5, the icons 501 to 508 each indicate the change rate of the corresponding virtual camera parameter of the virtual camera parameters. Further, the icon 509 indicates the entire change rate of the virtual camera parameters. In other words, a user can adjust the virtual camera parameters individually by operating the knobs 801 to 808 corresponding to the icons 501 to 508, respectively, and can collectively adjust the virtual camera parameters by operating the knob 809 corresponding to the icon 509. In addition, the change rate adjusted by each of the icons 501 to 508 and the change rate adjusted by the icon 509 adjust the parameters independent from one another. Specifically, change rates adjusted by the icons 501 to 508 will not be set to the same value even if the icon 509 is operated. Further, the icon 510 indicates an Expo value with which a response curve indicating a relationship between the amount of operation of the controller and the amount of change of a virtual camera parameter is determined (e.g., decided). The icon 511 indicates an Easing value with which a sliding degree (inertia) of a virtual camera is determined. The icon 512 indicates a boost value with which the amount of change of a virtual camera parameter at the time of pushing the boost button 607 is determined. The icons 513 and 514 respectively indicate values based on the input performed on the acceleration pedal 701 and the braking pedal 702.

In addition, it is assumed that the knob controller 133 is operated at a timing the joystick 131 and the foot pedal 132 are not operated. It is also assumed that a user determines (e.g., decides on) the value corresponding to each of the knobs by operating the knob controller 133 before operating the joystick 131 or the foot pedal 132 to determine (e.g., decide on) the maximum value of the change rate of each of the virtual camera parameters for the subsequent operation. In addition, when the knob controller 133 is not operated, the virtual camera control apparatus 110 retains the parameters input to the knob controller 133 last time.

Figure 2:
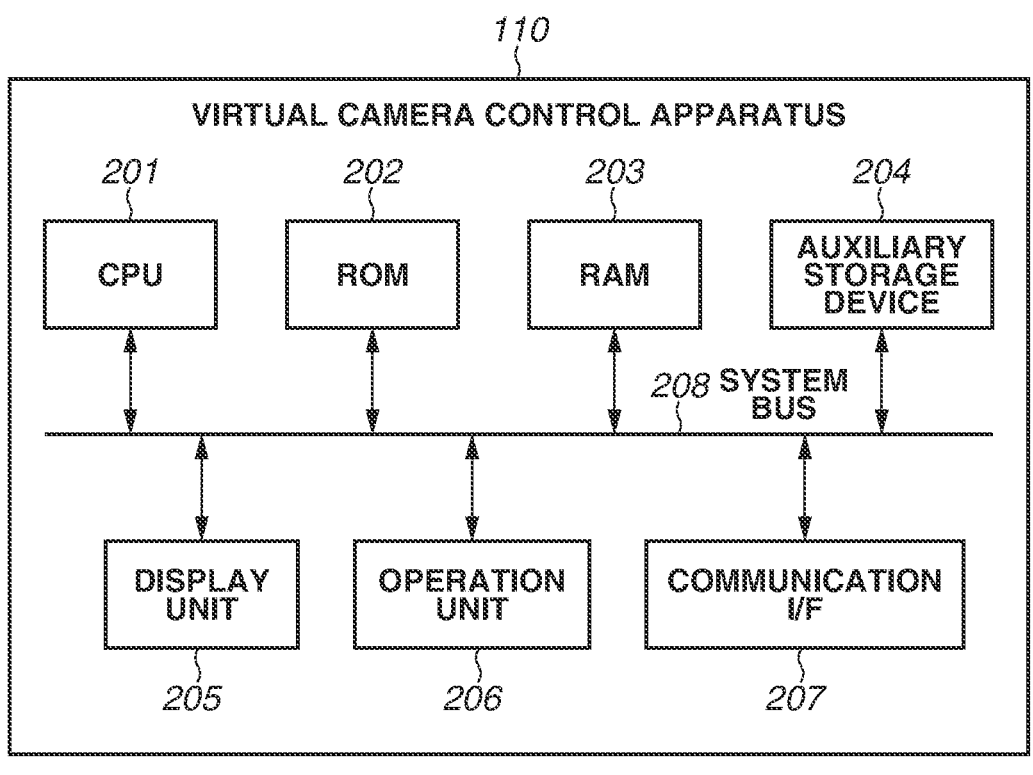
FIG. 2 is a block diagram illustrating a hardware configuration of a virtual camera control apparatus according to the first embodiment.

FIG. 2 is a block diagram illustrating a hardware configuration of the virtual camera control apparatus 110. In addition, hardware configurations of the operation apparatus 130 and the virtual viewpoint image generation apparatus 104 are similar to that of the virtual camera control apparatus 110 described below. The virtual camera control apparatus 110 includes a central processing unit (CPU) 201, a read-only memory (ROM) 202, a random-access memory (RAM) 203, an auxiliary storage device 204, a display unit 205, an operation unit 206, a communication interface (I/F) 207, and a system bus 208.

The CPU 201 carries out the respective functions of the virtual camera control apparatus 110 illustrated in FIG. 1 by generally controlling the virtual camera control apparatus 110 by using computer programs and data stored in the ROM 202 or the RAM 203. In addition, the virtual camera control apparatus 110 may include one or a plurality of pieces of dedicated hardware different from the CPU 201, so that at least part of the processing executed by the CPU 201 can be executed by the dedicated hardware. An application specific integrated circuit (ASIC), a field programmable gate array (FPGA), and a digital signal processor (DSP) can be given as the examples of the above-described dedicated hardware.

The ROM 202 stores programs which do not have to be changed.

The RAM 203 temporality stores programs and data supplied from the auxiliary storage device 204 and data supplied from the outside via the communication I/F 207.

For example, the auxiliary storage device 204 includes a hard disk drive, and stores various types of data, such as image data and sound data.

The display unit 205 includes, for example, a liquid crystal display or a light emitting diode (LED), and displays a GUI for allowing the user to issue instructions to the virtual camera control apparatus 110.

The operation unit 206 includes, for example, a keyboard, a mouse, a joystick, and/or a touch panel, and accepts operations performed by a user and inputs various instructions to the CPU 201. The CPU 201 operates as a display control unit for controlling the display unit 205 and an operation control unit for controlling the operation unit 206.

The communication I/F 207 is used for communicating with apparatuses the outside of the virtual camera control apparatus 110, such as the virtual viewpoint image generation apparatus 104, the display apparatus 106, and the operation apparatus 130. If the virtual camera control apparatus 110 has a function for wirelessly communicating with an external apparatus, the communication I/F 207 includes an antenna.

A system bus 208 connects to the units of the virtual camera control apparatus 110 and transmits information thereto.

In the present embodiment, the display unit 205 and the operation unit 206 are inside the virtual camera control apparatus 110. However, at least one of the display unit 205 and the operation unit 206 may be provided as another apparatus outside the virtual camera control apparatus 110.

Figure 3:
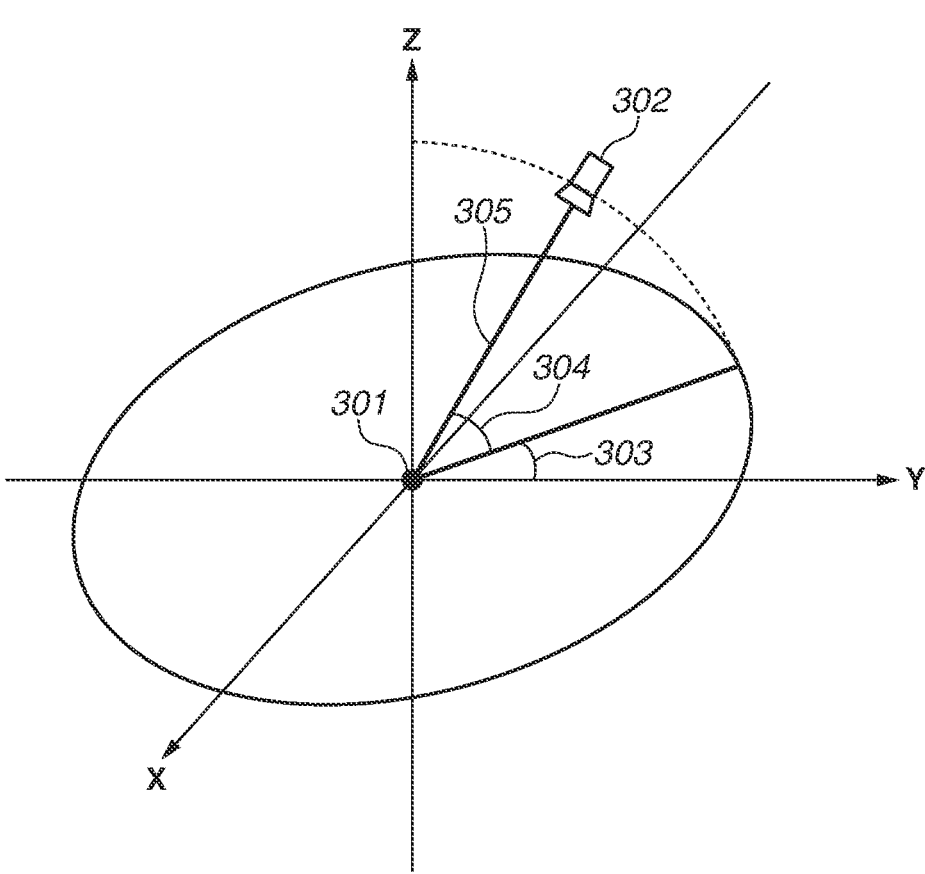
FIG. 3 is a diagram illustrating the relationship between point-of-gaze coordinates and a virtual camera position according to the first embodiment.

FIG. 3 is a diagram illustrating a relationship between point-of-gaze coordinates and a virtual camera position. FIG. 3 illustrates the position of a point-of-gaze 301, the position of a virtual camera 302, a pan 303 and a tilt 304 that represent an orientation, and a distance R 305. For a simple description, while the present embodiment is described based on the assumption that the point-of-gaze 301 is positioned at the origin (0, 0, 0), the position of the point-of-gaze 301 does not always have to be the origin, and can freely be specified in the three-dimensional space.

In the present embodiment, the virtual camera 302 moves on the spherical surface of a sphere with a radius R, the center of which the point-of-gaze 301 is present at.

The position of the virtual camera 302 on the spherical surface is uniquely determined based on the values of the pan 303 and the tilt 304. In other words, when the position of the point-of-gaze is expressed as (X, Y, Z) [m], orientation of the virtual camera is expressed as (Pan, Tilt, Roll) [degree], and the distance between the point-of-gaze and the virtual camera is expressed as R [m], virtual camera coordinates (Xcam, Ycam, Zcam) can be calculated through the following formulas.

$$Xcam = RCos\left(Tilt \times \frac{\pi}{180}\right) * \left(-Sin\left(Pan \times \frac{\pi}{180}\right)\right) + X \qquad \text{[Formula 1]}$$

$$Ycam = RCos\left(Tilt \times \frac{\pi}{180}\right) * \left(-Cos\left(Pan \times \frac{\pi}{180}\right)\right) + Y \qquad \text{[Formula 2]}$$

$$Zcam = R\left(-Sin\left(Tilt \times \frac{\pi}{180}\right)\right) + Z \qquad \text{[Formula 3]}$$

Values of Xcam, Ycam, and Zcam calculated as the above and values of Pan, Tilt, Roll, and Zoom are transmitted to the virtual camera parameter providing unit 118.

FIG. 4 is a flowchart illustrating processing executed by the virtual camera control apparatus 110. Through the processing, the virtual camera parameters are calculated based on operation information about various types of hardware included in the operation apparatus 130 and transmitted to the virtual viewpoint image generation apparatus 104 and the auxiliary image generation unit 122.

Steps S401 and S413 indicate repetitive processing, so that the processing in steps S402 to S412 is executed for each of frames. In the present embodiment, the frame rate is set to 59.94 drop frame (DF), so that the processing in steps S402 to S412 is executed every 1/59.94 seconds. This processing interval depends on the frame rate.

In step S402, the virtual camera control apparatus 110 acquires operation information about the joystick 131, the foot pedal 132, and the knob controller 133 from the operation apparatus 130.

In step S403, the change rate of each of the virtual camera parameters is determined based on the operation information acquired in step S402. The processing executed in step S403 will be described in detail in steps S430 to S441.

In step S404, the virtual camera control apparatus 110 determines on the response curve of the virtual camera. In other words, the virtual camera control apparatus 110 determines on the relationship between the amount of inclination of the joystick 131 and the amount of change of the virtual camera parameter when the joystick 131 is operated. In the present embodiment, the response curve is determined based on the Expo value indicated by the knob controller 133.

In step S405, the virtual camera control apparatus 110 determines (e.g., decides) on the inertia parameter of the virtual camera. In other words, the effectiveness of inertia at the time of moving the virtual camera is determined. In the present embodiment, the inertia parameter is determined based on the Easing value indicated by the knob controller 133. For example, inertia is not effective when the inertia parameter is 0. Thus, the virtual camera instantaneously stops moving when the operation for moving the virtual camera is ended. As the inertia parameter is increased, the virtual camera gradually stops moving when the operation for moving the virtual camera is ended. In addition, the inertia parameter may be a parameter which gives inertia not only when the virtual camera is moved but also when the angle of field is changed.

In step S406, the virtual camera control apparatus 110 determines on the amount of change of each of the virtual camera parameters based on the operation information acquired in step S402, the change rate of each of the virtual camera parameter determined in step S403, the response curve determined in step S404, and the inertia parameter determined in step S405.

In step S407, the virtual camera control apparatus 110 calculates the virtual camera parameters for the current frame. In other words, the virtual camera control apparatus 110 firstly adds the amount of change of each of the virtual camera parameters determined in step S406 to each of the virtual camera parameters for the previous frame. Further, the virtual camera control apparatus 110 calculates the virtual camera coordinates (Xcam, Ycam, Zcan) through the formulas 1 to 3 described with reference to FIG. 3. The calculated virtual camera coordinates (Xcam, Ycam, Zcam) and the values of Pan, Tilt, Roll, and Zoom from among the virtual camera parameters are the parameters to be transmitted to the virtual viewpoint image generation apparatus 104.

In step S408, the virtual camera control apparatus 110 updates the virtual camera parameters of the previous frame with the virtual camera parameters calculated in step S407, and retains the updated virtual camera parameters.

In step S409, the virtual camera control apparatus 110 transmits the values of Xcam, Ycam, Zcam, Pan, Tilt, Roll, and Zoom, calculated in step S407, to the virtual viewpoint image generation apparatus 104.

In step S410, the virtual camera control apparatus 110 acquires the time code of the previous frame retained by the time code retaining unit 119 and calculates the time code of the current frame by adding one frame thereto. In the present embodiment, calculation is executed based on the assumption that reproduction is executed at a reproduction speed of 100%. However, the present disclosure is not limited thereto. For example, when reproduction is executed at a reproduction speed of 200%, the time code may be calculated by adding two frames to the time code retained by the time code retaining unit 119. Alternatively, the time code may be saved in association with a certain scene, and the time code may be calculated by calling the saved time code. In this case, the time code associated with that scene is calculated as the time code of the current frame.

In step S411, the time code calculated in step S410 is retained by the time code retaining unit 119.

In step S412, the virtual camera control apparatus 110 transmits the time code calculated in step S410 to the virtual viewpoint image generation apparatus 104. Further, in the present disclosure, any method of transmission of the time code can be used. For example, the time code calculated in step S410 may be attached to and transmitted together with the virtual camera parameters transmitted from the virtual camera parameter providing unit 118 in step S409.

Details of the processing executed in step S403 are described in steps S430 to S441.

Steps S431 and S440 indicate repetitive processing, so that the processing in steps S432 to S439 is executed on each of the virtual camera parameters. In other words, the processing in steps S432 to S439 is executed on each of the eight parameters, i.e., point-of-gaze coordinates (X, Y, Z), orientation (Pan, Tilt, Roll) of the virtual camera, a distance R between the virtual camera and the point-of-gaze, and an angle of field Zoom. For a simple description, the processing in steps S432 to S439 will be described with respect to only the point-of-gaze coordinate X.

In step S432, an individual change rate parameter V1 is calculated with respect to the point-of-gaze coordinate X. In other words, an individual change rate parameter V1 set for each of the virtual camera parameters is calculated based on the value indicated by the icon 501 in FIG. 5. The value indicated by the icon 501 is changed by the operation performed on the knob 801. In the present embodiment, the icon 501 takes a value in the range from 0 to 100, and this value is directly used as a value of V1.

In step S433, an entire change rate parameter V2 of the virtual camera parameters is calculated. In other words, the value indicated by the icon 509 in FIG. 5 is calculated as the change rate parameter V2 commonly used for calculating the change rates of all of the virtual camera parameters. In the present embodiment, the icon 509 takes a value in the range from 0 to 100, and this value is directly used as the value of the entire change rate parameter V2.

In step S434, an acceleration value V3 is acquired. In other words, the virtual camera control apparatus 110 acquires the acceleration value V3 which is determined depending on how much the user presses down the acceleration pedal 701 included in the device in FIG. 7. As the user presses down the acceleration pedal 701, the icon 513 in FIG. 5 is rotated in conjunction with the user operation, and this user operation is also reflected in the value displayed under the icon 513. Thus, the user can adjust the pressing state of the acceleration pedal 701 while looking at the icon 513 and the value displayed under the icon 513. In the present embodiment, the acceleration value V3 takes a value in the range from 1.0 to 4.0, and takes 1.0 as an initial value when the user's foot is completely removed from the acceleration pedal 701.

In step S435, a braking value V4 is acquired. In other words, the virtual camera control apparatus 110 acquires the braking value V4 which is determined depending on how much the user presses down the braking pedal 702 included in the device in FIG. 7. As the user presses down the braking pedal 702, the icon 514 in FIG. 5 is rotated in conjunction with the user operation, and this user operation is also reflected in the value displayed under the icon 514. Thus, the user can adjust the pressing state of the braking pedal 702 while looking at the icon 514 and the value displayed under the icon 514. In the present embodiment, the braking value V4 takes a value in the range from 1.0 to 9.0, and takes 1.0 as an initial value when the user's foot is completely removed from the braking pedal 702.

In step S436, if a boost function is enabled (YES in step S436), the processing proceeds to step S437. If the boost function is disabled (NO in step S436), the processing proceeds to step S438. In the present embodiment, the virtual camera control apparatus 110 determines that the boost function is enabled with the boost button 607 pushed, and determines that the boost function is disabled with the boost button 607 not pushed.

In step S437, a boost value V5 is acquired. In other words, the boost value V5 is calculated through the following formula based on the boost value indicated by the icon 512 in FIG. 5. At this time, the boost value V5 is calculated with a Boost as a value indicated by the icon 512, and the Boost takes a value in the range between −4.0 and 4.0. The Boost takes 0.0 when the icon 512 points at its central position, the Boost takes −4.0 when the icon 512 is completely rotated to the left, and the Boost takes 4.0 when the icon 512 is completely rotated to the right.

$$V5 = 2^{Boost}$$

In other words, the boost value V5 takes a value in the range from $\frac{1}{16}$ to 16.

In step S438, the boost value V5 is set to 1.0.

In step S439, the change rate is calculated with respect to the point-of-gaze coordinate X. In other words, based on the values of V1, V2, V3, V4, and V5 determined in steps S432 to S438, the change rate is calculated through the following formula. In addition, the change rate of the point-of-gaze coordinate X is expressed as Vx.

$$Vx = \frac{V1 \times V2 \times V3 \times V5}{V4} \qquad \text{[Formula 4]}$$

In the present embodiment, the change rate of the virtual camera parameter is calculated through the multiplication of an individual change rate of each virtual camera parameter, an entire change rate, an acceleration value, a braking value, and a boost value. The reason for calculating the change rate of the virtual camera parameter through the multiplication is to increase the effect of each parameter on the calculated change rate of a virtual camera parameter. In addition, a calculation method thereof is not limited to the above, and the change rate of the virtual camera parameter may be calculated through the addition of the respective parameters.

Thus, in steps S430 to S441, the change rate of the virtual camera parameter is determined based on the operations performed on the joystick 131, the foot pedal 132, and the knob controller 133. The user is allowed to configure (e.g., decide on, select or control) the change rate by using the plurality of operation members, which allows adjustment of the change rate depending on various scenes captured in an image capturing environment, such as a sporting event where a required change rate is dynamically changed depending on a plurality of image capturing scenes. Further, the user can easily operate the virtual camera in tandem with the sudden movement of the subject since the change rate is determined based on the operation performed on the foot pedal 132.

Further, the amount of change of the virtual camera parameter is determined based on the Expo value that is set in step S404 based on the operation performed on the knob 810. Thus, the amount of change can be set according to the preference of the user. The knob 810 is a member different from the knobs 801 to 808 for individually setting the change rates of the virtual camera parameters, so that the user can adjust the sensitivity without changing the change rates. Further, the user can change the change rates without changing the sensitivity, so that the user can change the change rate of each of the virtual camera parameters while maintaining the sensitivity adjusted according to the user's preference. Thus, the user operation can easily be performed even if the user has changed the change rate in tandem with the sudden movement of the subject.

Further, the amount of change of the virtual camera parameter is determined based on the Easing value that is set in step S405 based on the operation performed on the knob 811. Thus, the visual expression of the virtual viewpoint image can be changed depending on the scene or the movement of the subject. It is assumed that the user wishes to operate the virtual camera to follow the ball when the user captures the scene of a baseball game where a batter hits a ball thrown by a pitcher. However, the direction of travel of the ball will be changed remarkably before and after the ball is hit by the batter. In this case, by setting a small value to the Easing value, the user can appropriately follow the ball and can also express a sudden change of the situation. Further, for example, when the user captures a scene where a runner is running via two or three bases, the running direction of the runner is not changed remarkably. Thus, by setting a large value to the Easing value, the user can prevent occurrence of motion sickness caused by a sudden change of the screen. The knob 811 for setting the Easing value is a member different from the knobs 801 to 808 for setting the change rates of the virtual camera parameters, so that the user can set the change rates of the virtual camera parameters while maintaining the visual expression of the virtual viewpoint image the user wishes to capture. In the present embodiment, the Easing value is set with the knob 811. However, the present disclosure is not limited thereto. For example, when a virtual camera is operated by using a game controller with built-in joysticks, a function for changing the Easing value may be allocated to a button included in the game controller. In this way, the user can change the Easing value while operating the joysticks, so that the visual expression can be changed depending on the scene or the subject when the user captures a sporting event where one scene is suddenly changed to another scene.

As described above, according to the present embodiment, a user sets acceleration/braking values by operating the foot pedals 132 while performing the operation at change rates of the virtual camera parameters previously set through the knob controller 133. In this way, the user can perform the operation while coping with sudden changes in speed of a subject.

A second embodiment will be described. The first embodiment has been described with respect to the technique which allows a user to cope with a sudden change in speed of a subject by using the acceleration pedal 701 and the braking pedal 702 while performing the operation at change rates previously set through the knob controller 133. According to the above-described technique, the change rates of all of the virtual camera parameters are changed when the acceleration pedal 701 or the braking pedal 702 is pressed down. However, depending on the image capturing environment of a virtual viewpoint image, there is a case where a user does not wish to change the change rates of all of the virtual camera parameters. For example, it is conceivable that the user wishes to maintain the change rate of the orientation of a virtual camera in order to prevent motion sickness. Thus, the present embodiment will be described with respect to a configuration which allows a user to select whether the acceleration value V3 corresponding to the acceleration pedal 701 and the braking value V4 corresponding to the braking pedal 702 are reflected in the calculation of the change rate for each of the virtual camera parameters.

Figure 9:
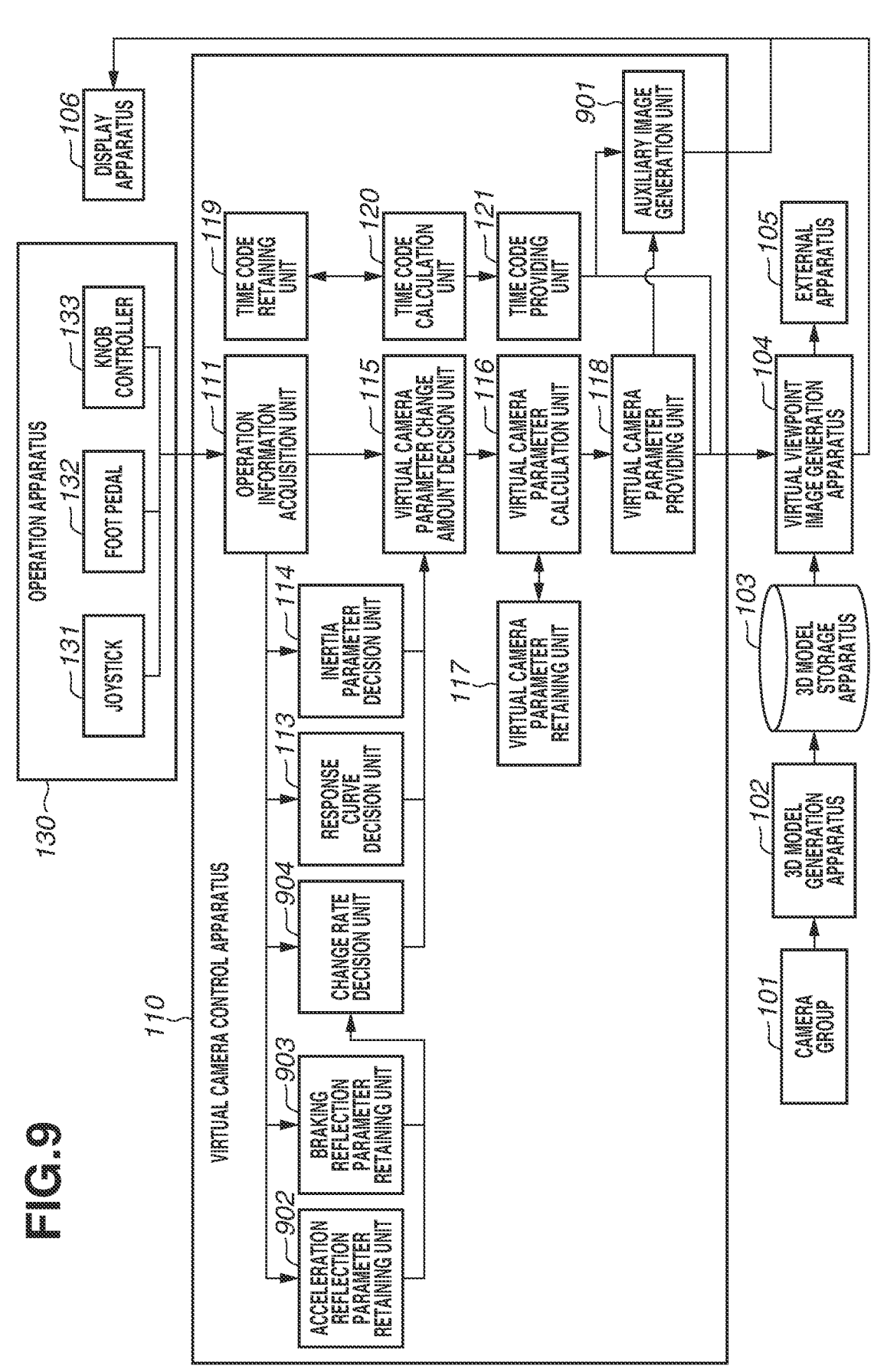
FIG. 9 is a block diagram illustrating a system configuration of an image processing system according to a second embodiment.

FIG. 9 is a block diagram illustrating a system configuration of an image processing system 100 according to the present embodiment. Like numbers refer to like constituent elements illustrated in FIG. 1, and the descriptions thereof will be omitted.

An auxiliary image generation unit 901 generates an auxiliary image 1100 in FIG. 11 in addition to the auxiliary image 500 in FIG. 5.

FIG. 11 is a diagram illustrating an example of a GUI (i.e., auxiliary image 1100) for specifying virtual camera parameters on which acceleration and braking are to be reflected. Each of checkboxes 1101 to 1108 in FIG. 11 is a checkbox for selecting a virtual camera parameter whose change rate is increased as the acceleration pedal 701 is pressed down. For example, if check marks are placed on the checkboxes 1102, 1103, and 1104, the change rates of the point-of-gaze coordinate X, the point-of-gaze coordinate Y, and the distance R from a point-of-gaze to a virtual camera are increased as the acceleration pedal 701 is pressed down. Further, the change rates of the virtual camera parameters without check marks are not increased. Further, similar to the configuration described in the first embodiment, the degree of increase of a change rate varies depending on how much the acceleration pedal 701 is pressed down, and the change rate is not increased when the user's foot is completely removed from the acceleration pedal 701. Further, each of checkboxes 1109 to 1116 is a checkbox for selecting a virtual camera parameter whose change rate is decreased as the braking pedal 702 is pressed down. For example, if the braking pedal 702 is pressed down with check marks placed on all of the checkboxes 1109 to 1116, the change rates of all of the virtual camera parameters are decreased.

An acceleration reflection parameter retaining unit 902 retains information indicating whether an acceleration value is to be reflected in calculation of the change rate for each of the virtual camera parameters. This information is determined based on whether a check mark is placed on each of the checkboxes 1101 to 1108 illustrated in the auxiliary image 1100 in FIG. 11.

A braking reflection parameter retaining unit 903 retains information indicating whether a braking value is to be reflected in calculation of the change rate for each of the virtual camera parameters. This information is determined based on whether a check mark is placed on each of the checkboxes 1110 to 1116 illustrated in the auxiliary image 1100 in FIG. 11.

A change rate decision unit 904 determines (e.g., decides on) the change rate for each of the virtual camera parameters based on values acquired from the operation information acquisition unit 111 and the information retained by the acceleration reflection parameter retaining unit 902 and the braking reflection parameter retaining unit 903. Specifically, the change rate decision unit 904 determines the change rate for each of the eight parameters, i.e., point-of-gaze coordinates (X, Y, Z) [m], orientation (Pan, Tilt, Roll) [degree] of a virtual camera, a distance R [m] between a virtual camera and a point-of-gaze, and an angle of field Zoom [mm] of a virtual camera. Specific change rate decision processing will be described below with reference to FIG. 10.

Figure 10:
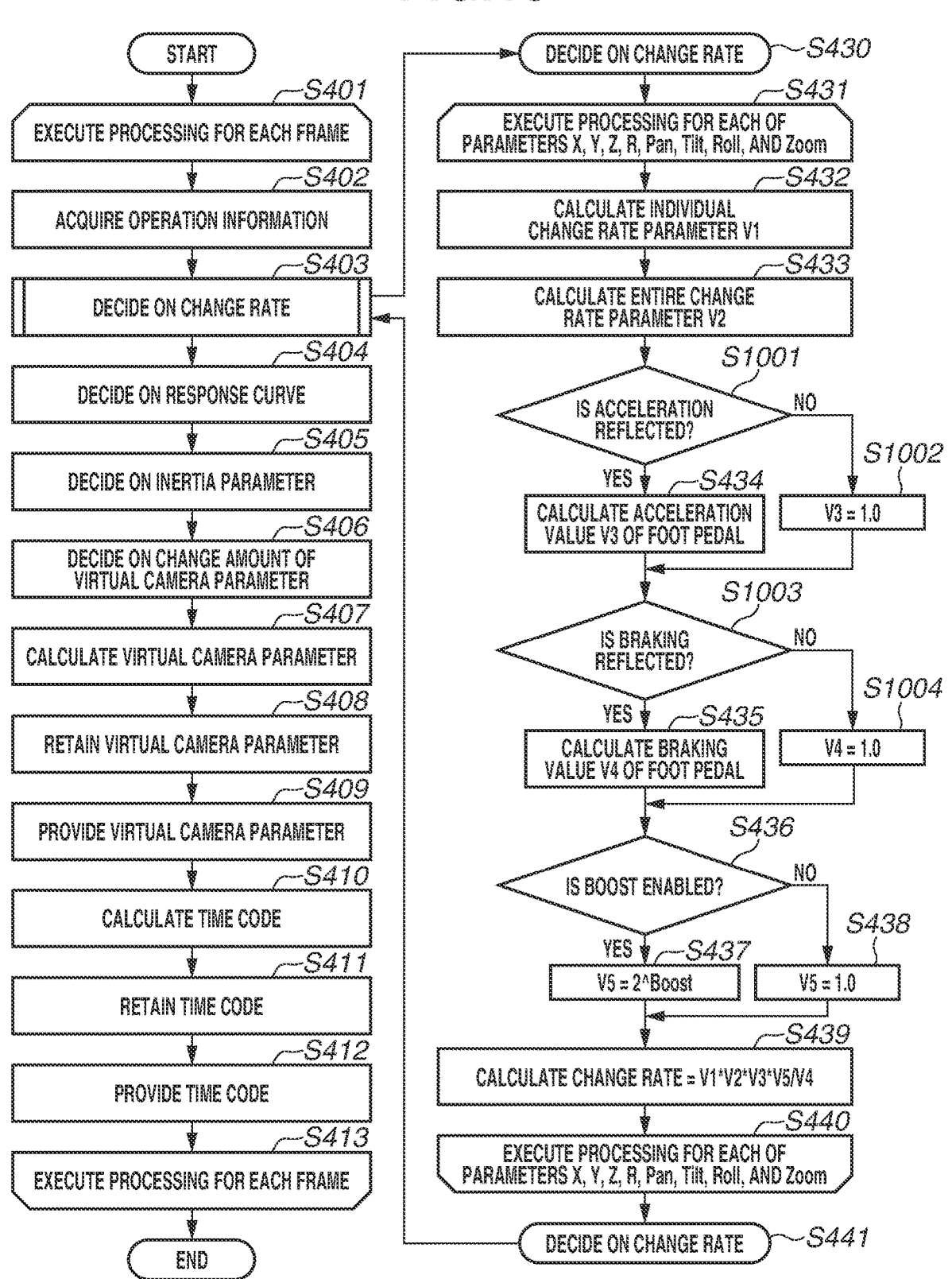
FIG. 10 is a flowchart illustrating processing for calculating virtual camera parameters of a virtual camera control apparatus according to the second embodiment.

FIG. 10 is a flowchart illustrating processing for calculating the virtual camera parameters of the virtual camera control apparatus 110 according to the present embodiment. The processing in steps S401 to S413 and steps S430 to S440 in FIG. 4 is also common to the present embodiment. Thus, the descriptions thereof will be omitted.

In step S1001, based on information retained by the acceleration reflection parameter retaining unit 902, if the acceleration value is reflected in the calculation of the point-of-gaze coordinate X (YES in step S1001), the processing proceeds to step S434. If the acceleration value is not reflected in the point-of-gaze coordinate X (NO in step S1001), the processing proceeds to step S1002. In addition, whether the acceleration value is reflected in the calculation of the change rate of the point-of-gaze coordinate X is based on whether a check mark is placed on the checkbox 1101 in FIG. 11. In the present embodiment, if a check mark is placed on the checkbox 1101, the acceleration value is reflected in the calculation of the change rate of the point-of-gaze coordinate X. Thus, the processing proceeds to step S434. On the other hand, if a check mark is not placed thereon, the processing proceeds to step S1002.

In step S1002, the acceleration value V3 is set to 1.0. Thereafter, the processing proceeds to step S1003.

In step S1003, based on the information retained by the braking reflection parameter retaining unit 903, if the braking value is reflected in the calculation of the point-of-gaze coordinate X (YES in step S1003), the processing proceeds to step S435. If the braking value is not reflected in the calculation of the point-of-gaze coordinate X (NO in step S1003), the processing proceeds to step S1004. In addition, whether the braking value is reflected in the calculation of the change rate of the point-of-gaze coordinate X is based on whether a check mark is placed on the checkbox 1109 in FIG. 11. In the present embodiment, if a check mark is placed on the checkbox 1109, the braking value is reflected in the calculation of the change rate of the point-of-gaze coordinate X. Thus, the processing proceeds to step S435. On the other hand, if the check mark is not placed thereon, the processing proceeds to step S1004.

In step S1004, the braking value V4 is set to 1.0. Thereafter, the processing proceeds to step S436.

As described above, the present embodiment has been described with respect to the configuration which allows a user to select whether the acceleration value V3 corresponding to the acceleration pedal 701 and the braking value V4 corresponding to the braking pedal 702 are reflected in calculation of the change rate for each of the virtual camera parameters. Through the above-described configuration, the change rates of only a part of the virtual camera parameters can be changed by acceleration or braking. In other words, for example, it is possible to respond to a use case in which the change rate of only the point-of-gaze coordinates (X, Y, Z) is increased while making the change rates of Pan, Tilt, and Roll remain constant.

According to the present disclosure, a virtual camera can be easily operated depending on the movement of a subject.

While the present disclosure has been described based on the plurality of embodiments, the present disclosure is not limited to the above-described embodiments, and various modifications and changes are possible based on the spirit of the present disclosure. Further, such modifications and changes should not be excluded from the scope of the present disclosure.

Further, a computer program which realizes a function for executing all or a part of the control according to the present embodiments may be supplied to an image processing system via a network or various types of storage media. Then, a computer (or a CPU or a micro processing unit (MPU)) of the image processing system may read and execute the program. In this case, the program and the storage medium which stores the program is included in the present disclosure.

Furthermore, the disclosure of the present embodiments includes the following configurations, a method, and a program.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to embodiments, it is to be understood that the disclosure is not limited to the disclosed embodiments. The scope of the following claims encompasses all such modifications and equivalent structures and functions.

This application claims the benefit of Japanese Patent Application No. 2023-056850, filed Mar. 31, 2023, which is hereby incorporated by reference herein in its entirety.

What is claimed is:

1. An information processing apparatus comprising:
one or more memories storing instructions; and
one or more processors executing the instructions to:
acquire input information about an input corresponding to an operation performed on a first member, the input changing a first position parameter indicating a position of a first axis and a second position parameter indicating a position of a second axis of a point-of-gaze corresponding to a virtual camera corresponding to a virtual view point image generated based on a plurality of captured images acquired by image-capturing a subject by a plurality of image capturing apparatuses;
acquire a first adjustment parameter for adjusting an amount of change of the first position parameter when an amount of the operation on the first member is maximum;
acquire a second adjustment parameter for adjusting the amount of change of the first position parameter and the second position parameter when an amount of the operation on the first member is maximum;
acquire a third adjustment parameter for adjusting the amount of change of the first position parameter and the second position parameter with respect to an amount of the operation on the first member; and
decide on the amount of change of the first position parameter and the second position parameter based on the input information, the first adjustment parameter, the second adjustment parameter, and the third adjustment parameter.

2. The information processing apparatus according to claim 1, wherein the second adjustment parameter is a parameter for increasing a change rate of the first position parameter and the second position parameter or a parameter for reducing a change rate of the first position parameter and the second position parameter.

3. The information processing apparatus according to claim 1, wherein the first member is a joystick.

4. The information processing apparatus according to claim 1,
wherein the second adjustment parameter is a parameter for changing sensitivity for the virtual camera, and wherein the sensitivity is decided based on a response curve.

5. The information processing apparatus according to claim 1, wherein the one or more processors execute the instructions further to output the first position parameter and the second position parameter to which the amount of change is added.

6. The information processing apparatus according to claim 1, wherein the one or more processors execute the instructions further to generate an auxiliary image indicating the first adjustment parameter and the second adjustment parameter.

7. The information processing apparatus according to claim 1, wherein the information processing apparatus decides that the point-of-gaze is positioned on an optical axis of the virtual camera.

8. The information processing apparatus according to claim 1, wherein the one or more processors execute the instructions further to acquire a fifth adjustment parameter by which the amount of change is decided based on the amount of operation and elapsed time of the operation, wherein the amount of change is decided based on the input, the first adjustment parameter, the second adjustment parameter, and the fifth adjustment parameter.

9. The information processing apparatus according to claim 1, wherein the first adjustment parameter is acquired based on an operation on a second member different from the first member, and wherein the second adjustment parameter is acquired based on an operation on a third member different from the first member.

10. The information processing apparatus according to claim 9, wherein the second member is a knob, and wherein the third member is a knob different from the second member.

11. An information processing method comprising:

acquiring, as a first acquisition, input information about an input corresponding to an operation performed on a first member, the input a first position parameter indicating a position of a first axis and a second position parameter indicating a position of a second axis of a point-of-gaze corresponding to a virtual camera corresponding to a virtual view point image generated based on a plurality of captured images acquired by image-capturing a subject by a plurality of image capturing apparatuses;

acquiring, as a second acquisition, a first adjustment parameter for adjusting an amount of change of the first position parameter when an amount of the operation on the first member is maximum;

acquiring, as a third acquisition, a second adjustment parameter for adjusting the amount of change of the first position parameter and the second position parameter when an amount of the operation on the first member is maximum;

acquiring a third adjustment parameter for adjusting the amount of change of the first position parameter and the second position parameter with respect to an amount of the operation on the first member; and deciding on the amount of change of the first position parameter and the second position parameter based on the input information, the first adjustment parameter, and the second adjustment parameter, and the third adjustment parameter.

12. A non-transitory computer-readable storage medium storing a program which, when read and executed by a computer, causes the computer to execute the steps of a method of controlling an image processing apparatus, the method comprising:

acquiring, as a first acquisition, input information about an input corresponding to an operation performed on a first member, the input a first position parameter indicating a position of a first axis and a second position parameter indicating a position of a second axis of a point-of-gaze corresponding to a virtual camera corresponding to a virtual view point image generated based on a plurality of captured images acquired by image-capturing a subject by a plurality of image capturing apparatuses;

acquiring, as a second acquisition, a first adjustment parameter for adjusting an amount of change of the first position parameter when an amount of the operation on the first member is maximum;

acquiring, as a third acquisition, a second adjustment parameter for adjusting the amount of change of the first position parameter and the second position parameter when an amount of the operation on the first member is maximum;

acquiring a third adjustment parameter for adjusting the amount of change of the first position parameter and the second position parameter with respect to an amount of the operation on the first member; and deciding on the amount of change of the first position parameter and the second position parameter based on the input information, the first adjustment parameter, and the second adjustment parameter, and the third adjustment parameter.

* * * * *